US011878332B2

(12) United States Patent
Maeng et al.

(10) Patent No.: US 11,878,332 B2
(45) Date of Patent: Jan. 23, 2024

(54) PANEL FLATTENING ASSEMBLY AND DISPLAY MODULE INCLUDING THE SAME

(71) Applicant: Samsung Display Co., LTD., Yongin-si (KR)

(72) Inventors: Hyun Jin Maeng, Yongin-si (KR); Min Gwan Hyun, Yongin-si (KR); Man Soo Kim, Yongin-si (KR); Ju Hee Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/736,388

(22) Filed: May 4, 2022

(65) Prior Publication Data
US 2023/0038699 A1 Feb. 9, 2023

(30) Foreign Application Priority Data
Aug. 9, 2021 (KR) .......................... 10-2021-0104709

(51) Int. Cl.
*G02F 1/1333* (2006.01)
*B21D 1/00* (2006.01)
*B21D 25/04* (2006.01)

(52) U.S. Cl.
CPC ............... *B21D 1/00* (2013.01); *B21D 25/04* (2013.01); *G02F 1/133314* (2021.01)

(58) Field of Classification Search
CPC ......... G02F 1/133308; G02F 1/133314; G02F 1/133322; G02F 1/133325
USPC ............................................................ 349/58
See application file for complete search history.

(56) References Cited

FOREIGN PATENT DOCUMENTS

| CN | 104049394 A | * | 9/2014 |
|----|-------------|---|--------|
| CN | 210925299 U | * | 7/2020 |
| CN | 214207791 U | * | 9/2021 |
| KR | 10-1676474  |   | 11/2016 |

* cited by examiner

*Primary Examiner* — Christopher M Raabe
(74) *Attorney, Agent, or Firm* — KILE PARK REED & HOUTTEMAN PLLC

(57) ABSTRACT

A panel flattening assembly includes a first fixing assembly and a second fixing assembly respectively disposed at a first corner and a second corner adjacent to the first corner in a first direction on a rear surface of a display panel; a first supporting member disposed between the first fixing assembly and the second fixing assembly and spaced apart from the display panel; a first displacement adjusting member connected to the first fixing assembly and adjusting a distance between the first fixing assembly and a first end of the first supporting member by adjusting a displacement of the first fixing assembly; and a second displacement adjusting member connected to the second fixing assembly and adjusting a distance between the second fixing assembly and a second end of the first supporting member by adjusting a displacement of the second fixing assembly.

20 Claims, 7 Drawing Sheets

10, 20, 30, 40, AM1, AM2, AM3, AM4, AM5, AM6, AM7, AM8, SP1, SP2, SP3, SP4: PPA

PANEL FLATTENING ASSEMBLY AND DISPLAY MODULE INCLUDING THE SAME

CROSS-REFERENCE TO RELATED APPLICATION

The application claims priority to and the benefit of Korean Patent Application No. 10-2021-0104709 under 35 U.S.C. § 119, filed Aug. 9, 2021, the entire contents of which are incorporated herein by reference.

BACKGROUND

1. Technical Field

The disclosure relates to a display device, and more particularly, to a panel flattening assembly and a display module including the same.

2. Description of the Related Art

As interest in information display increases and demand to use portable information media increases, demand for display devices and commercialization are being made intensively.

In addition, as the thickness of a display device and an electronic device including the same become thinner, the thickness of a substrate included in a display panel is being developed and applied to a very thin level of about 200 μm or less.

Such an ultra-thin display panel has a weak shape retaining force, and a tape, a heat dissipation film, a shape supporting member, or the like is attached to a rear surface the display panel to maintain the shape of the display panel.

SUMMARY

An object of the disclosure is to provide a panel flattening assembly capable of flattening a display panel by being attached to a minimum area on a rear surface of the display panel.

Another object of the disclosure is to provide a display module including the panel flattening assembly.

However, objects of the disclosure are not limited to the above-described objects, and may be variously extended without departing from the spirit and scope of the disclosure.

In order to achieve the object of the disclosure, a panel flattening assembly according to embodiments of the disclosure may include a first fixing assembly and a second fixing assembly respectively disposed at a first corner and a second corner adjacent to the first corner in a first direction on a rear surface of a display panel; a first supporting member disposed between the first fixing assembly and the second fixing assembly and spaced apart from the display panel; a first displacement adjusting member connected to the first fixing assembly and adjusting a distance between the first fixing assembly and a first end of the first supporting member by adjusting a displacement of the first fixing assembly; and a second displacement adjusting member connected to the second fixing assembly and adjusting a distance between the second fixing assembly and a second end of the first supporting member by adjusting a displacement of the second fixing assembly.

According to an embodiment, the first fixing assembly may include a first fixing member attached to the first corner on the rear surface of the display panel; and a second fixing member connected to the first fixing member with the first displacement adjusting member disposed between the second fixing member and the first fixing member.

According to an embodiment, the first displacement adjusting member may include a first screw protruding toward the second fixing assembly and having a protrusion connected to the first supporting member.

According to an embodiment, the first fixing member and the second fixing member may include grooves into which part of the first screw is inserted so that movement other than rotation of the first screw is restricted within the first fixing assembly.

According to an embodiment, by rotation of the first screw, the first screw and the first fixing assembly may be moved together in the first direction or in a direction opposite to the first direction, and the distance between the first fixing assembly and the first end of the first supporting member may be adjusted.

According to an embodiment, the second displacement adjusting member may include a second screw protruding toward the first fixing assembly and having a protrusion connected to the first supporting member.

According to an embodiment, by rotation of the second screw, the second screw and the second fixing assembly may be moved together in the first direction or in the direction opposite to the first direction, and the distance between the second fixing assembly and the second end of the first supporting member may be adjusted.

According to an embodiment, the panel flattening assembly may further include a third fixing assembly disposed at a third corner adjacent to the first corner in a second direction on the rear surface of the display panel; and a second supporting member disposed between the first fixing assembly and the third fixing assembly and spaced apart from the display panel.

According to an embodiment, the panel flattening assembly may further include a third displacement adjusting member disposed on the second fixing member and adjusting a distance between the first fixing assembly and a first end of the second supporting member by adjusting the displacement of the first fixing assembly.

According to an embodiment, the first fixing assembly may further include a third fixing member disposed on the third displacement adjusting member and the second fixing member. The third displacement adjusting member may include a third screw protruding toward the third fixing assembly and having a protrusion connected to the second supporting member.

According to an embodiment, the second fixing member and the third fixing member may include grooves into which part of the third screw is inserted so that movement other than rotation of the third screw is restricted within the first fixing assembly.

According to an embodiment, the panel flattening assembly may further include a fourth fixing assembly disposed at a fourth corner adjacent to the second corner in the second direction on the rear surface of the display panel; a third supporting member disposed between the third fixing assembly and the fourth fixing assembly and spaced apart from the display panel; a fourth supporting member disposed between the second fixing assembly and the fourth fixing assembly and spaced apart from the display panel; a fourth displacement adjusting member connected to the third fixing assembly and a second end of the second supporting member; a fifth displacement adjusting member connected to the third fixing assembly and a first end of the third supporting member; a sixth displacement adjusting member connected to the fourth fixing assembly and a second end of the third supporting member; a seventh displacement adjusting member connected to the second fixing assembly and a first end of the fourth supporting member; and an eighth displacement adjusting member connected to the fourth fixing assembly and a second end of the fourth supporting member.

According to an embodiment, the second supporting member may be directly connected to the first fixing assembly and the third fixing assembly.

According to an embodiment, the first displacement adjusting member may include a first spring member disposed between the first fixing assembly and the first end of the first supporting member, and the second displacement adjusting member may include a second spring member disposed between the second fixing assembly and the second end of the first supporting member.

According to an embodiment, the first fixing assembly and the second fixing assembly may include a magnetic material.

In order to achieve the object of the disclosure, a display module according to embodiments of the disclosure may include a display panel including a substrate; a panel flattening assembly attached to a corner portion on a rear surface of the display panel; a circuit plate disposed on the panel flattening assembly; and a back cover covering the rear surface of the display panel, the panel flattening assembly, and the circuit plate. The panel flattening assembly may include a first fixing assembly and a second fixing assembly respectively disposed at a first corner and a second corner adjacent to the first corner in a first direction on the rear surface of the display panel; a first supporting member disposed between the first fixing assembly and the second fixing assembly and spaced apart from the display panel; a first displacement adjusting member connected to the first fixing assembly and adjusting a distance between the first fixing assembly and a first end of the first supporting member by adjusting a displacement of the first fixing assembly; and a second displacement adjusting member connected to the second fixing assembly and adjusting a distance between the second fixing assembly and a second end of the first supporting member by adjusting a displacement of the second fixing assembly.

According to an embodiment, the first fixing assembly may include a first fixing member attached to the first corner on the rear surface of the display panel; and a second fixing member connected to the first fixing member with the first displacement adjusting member disposed between the second fixing member and the first fixing member.

According to an embodiment, the first displacement adjusting member may include a first screw protruding toward the second fixing assembly and having a protrusion connected to the first supporting member.

According to an embodiment, the second displacement adjusting member may include a second screw protruding toward the first fixing assembly and having a protrusion connected to the first supporting member.

According to an embodiment, the first fixing assembly and the second fixing assembly include a magnetic material.

BRIEF DESCRIPTION OF THE DRAWINGS

The accompanying drawings, which are included to provide a further understanding of the inventive concepts, and are incorporated in and constitute a part of this specification, illustrate embodiments of the disclosure, and, together with the description, serve to explain principles of the disclosure.

DETAILED DESCRIPTION OF THE EMBODIMENTS

Figure 1:
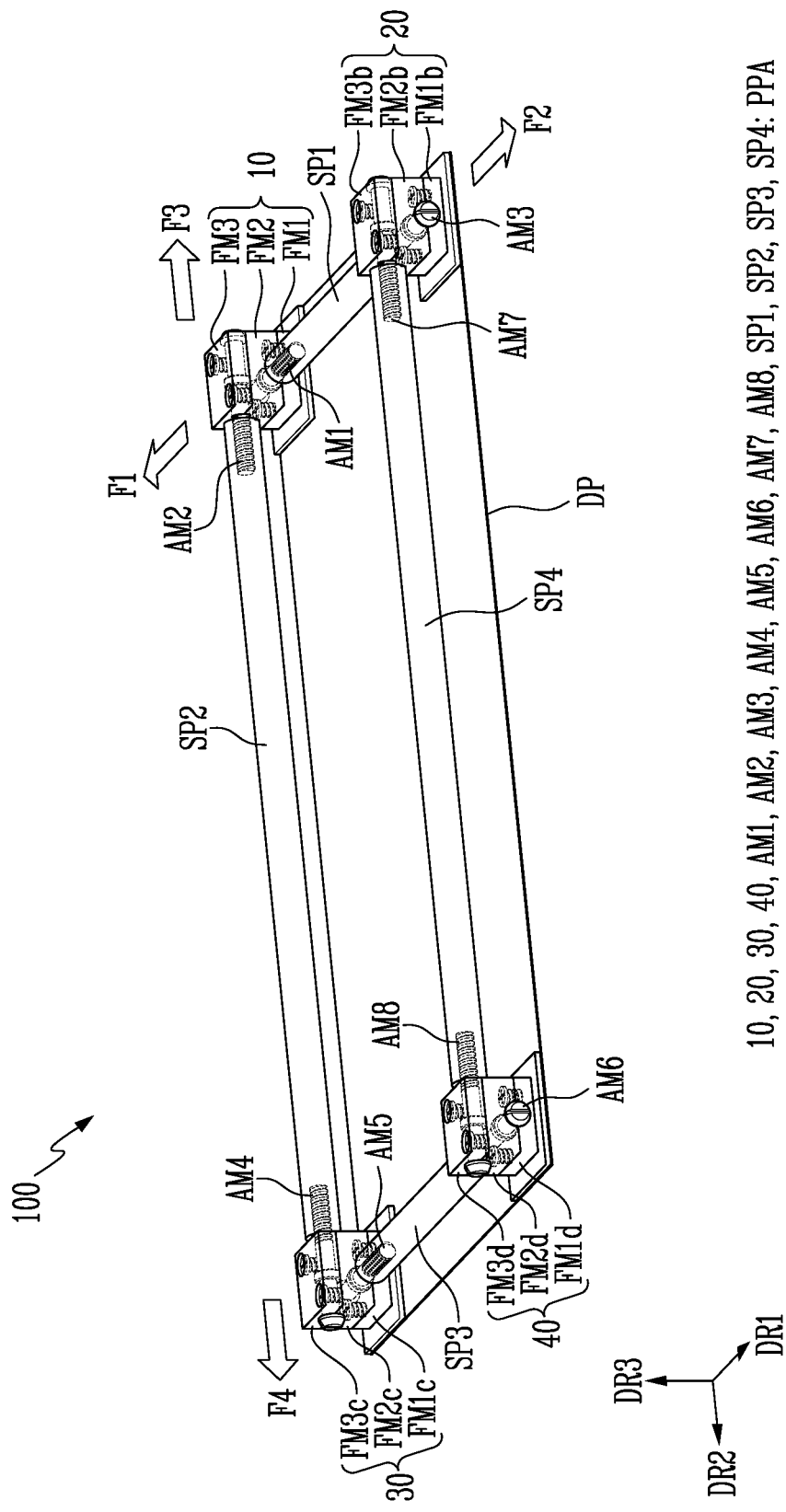
FIG. 1 is a perspective view schematically illustrating a panel flattening assembly according to embodiments of the disclosure.

As the disclosure allows for various changes and numerous embodiments, particular embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure.

It will be understood that, although the terms "first", "second", and the like may be used herein to describe various elements, these elements should not be limited by these terms. These terms are only used to distinguish one element from another element. For instance, a first element discussed below could be termed a second element without departing from the scope of the disclosure. Similarly, the second element could also be termed the first element. In the disclosure, the singular forms are intended to include the plural forms (or meanings) as well, unless the context clearly indicates otherwise.

It will be further understood that the terms "comprise", "include", "have", and the like used in the disclosure, specify the presence of stated features, integers, steps, operations, elements, components, and/or combinations of them but do not preclude the presence or addition of one or more other features, integers, steps, operations, elements, components, and/or combinations thereof. In addition, when a first part such as a member, assembly, plat, panel, etc. is on a second part, the first part may be not only "directly on" the second part but a third part may intervene between them. Furthermore, in the disclosure, when a first part such as a member, assembly, plat, panel, etc. is formed on a second part, the surface of the second part on which the first part is formed is not limited to an upper surface of the second part but may include other surfaces such as a side surface or a lower surface of the second part. To the contrary, when a first part such as a member, assembly, plat, panel, etc. is "under" a second part, the first part may be not only "directly under" the second part but a third part may intervene between them.

The terms "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, embodiments of the disclosure will be described in more detail with reference to the accompanying drawings. The same reference numerals are used for the same components in the drawings, and duplicate descriptions of the same components are omitted.

Figure 2:
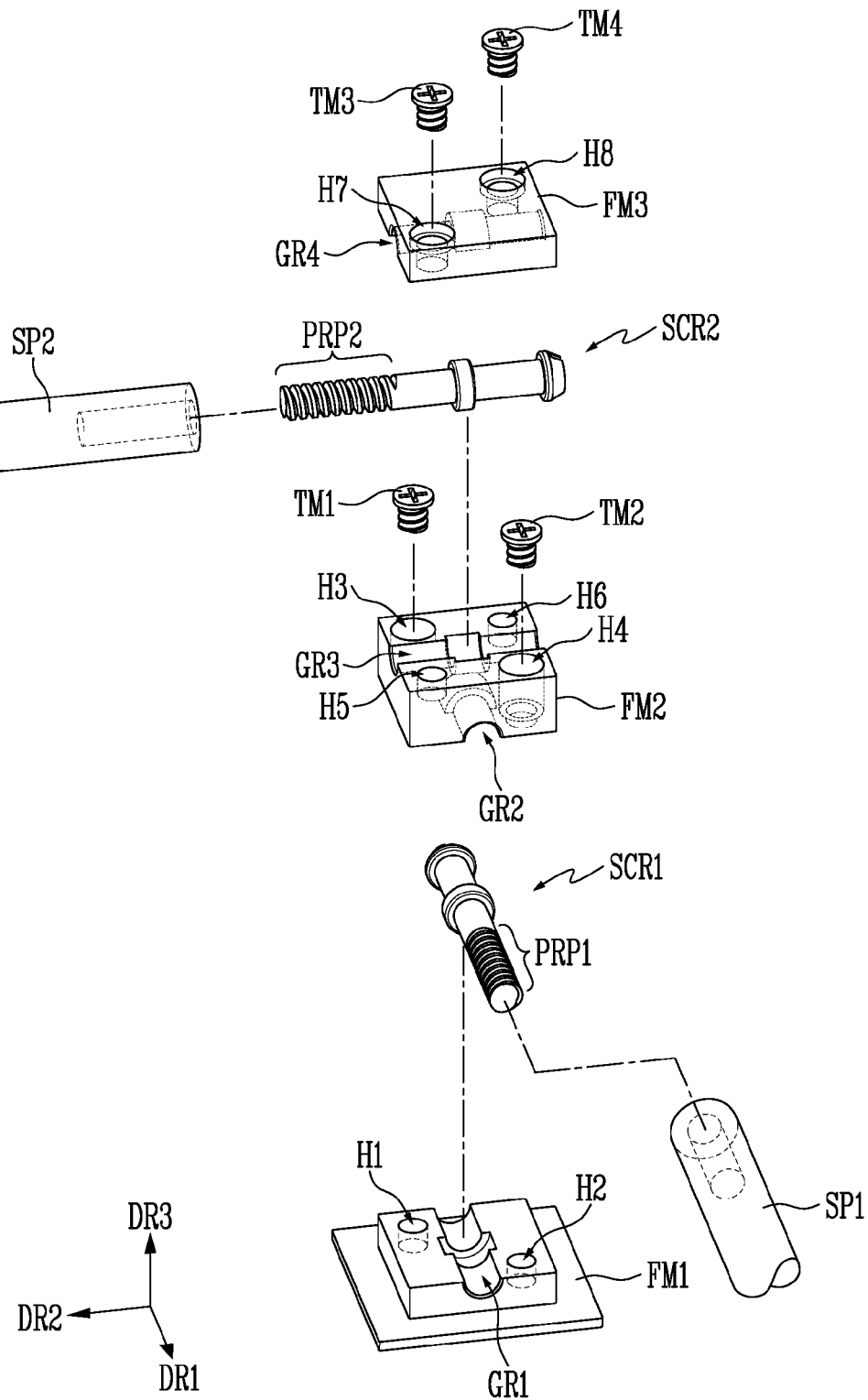
FIG. 2 is an exploded perspective view schematically illustrating an example of a portion of the panel flattening assembly of FIG. 1.
Figure 3:
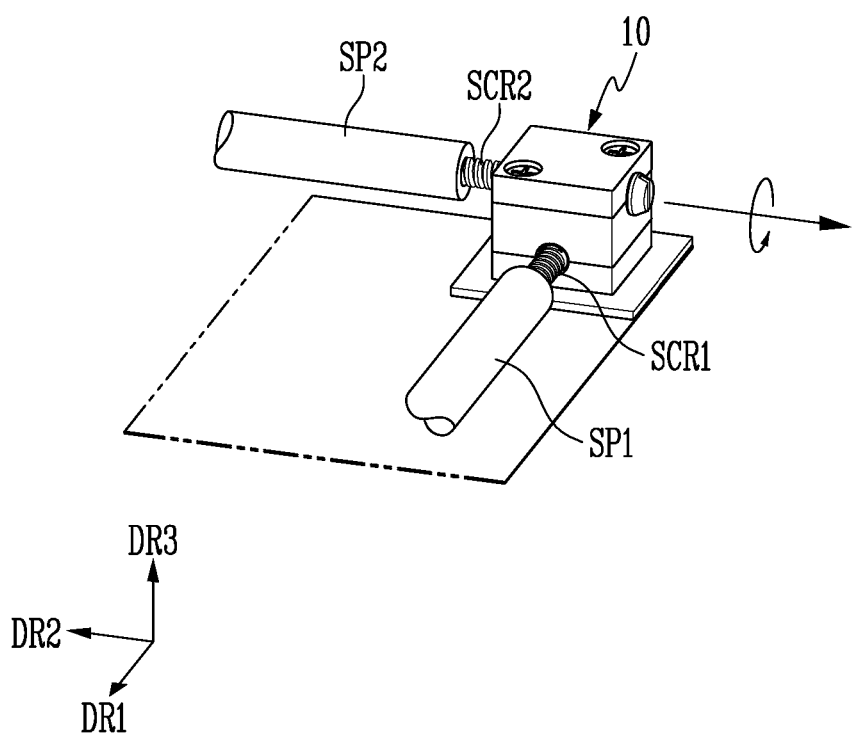
FIG. 3 is a diagram schematically illustrating an example of a portion of the panel flattening assembly of FIG. 1.

FIG. 1 is a schematic perspective view illustrating a panel flattening assembly according to embodiments. FIG. 2 is a schematic exploded perspective view illustrating an example of a portion of the panel flattening assembly of FIG. 1. FIG. 3 is a schematic diagram illustrating an example of a portion of the panel flattening assembly of FIG. 1.

Referring to FIGS. 1, 2, and 3, a panel flattening assembly PPA may include fixing assemblies 10, 20, 30, and 40, supporting members SP1, SP2, SP3, and SP4, and displacement adjusting members AM1, AM2, AM3, AM4, AM5, AM6, AM7, and AM8.

In an embodiment, the panel flattening assembly PPA may be attached to a rear surface of a display panel DP. The display panel DP may include a substrate and a pixel structure and a backplane structure formed on a front surface of the substrate. Thus, the panel flattening assembly PPA may be attached to a rear surface of the substrate.

A structure in which the panel flattening assembly PPA is attached to the display panel DP may be defined as a panel assembly 100.

As the thickness of the display panel DP becomes thinner or smaller, the thickness, for example, of about 200 µm or less, of the substrate included in the display panel DP may be very small. For example, the substrate may be implemented as a transparent polymer organic substrate including polyimide, polyamide, or the like, a plastic substrate, or the like.

A thin substrate has a weak shape retaining force, and the shape of the substrate (and the display panel DP) may be unintentionally deformed or bent during a manufacturing process or when in use. Accordingly, a component or material for fixing and maintaining the shape of the display panel DP including the substrate should be added.

As the component for fixing the shape of the display panel DP, a full-surface adhesive component such as a tape, a heat dissipation film, and the like may be used. The full-surface adhesive component may be attached to the entire rear surface of the display panel DP in order to assist the surface of the substrate of the display panel DP to be flat.

However, due to an adhesive surface of the full-surface adhesive component, non-uniform surface roughness of the adhesive surface may be visually recognized through a front surface of a transparent substrate, and the non-uniform surface roughness may cause poor visibility.

In order to fix the shape of the display panel DP while minimizing such poor visibility, an adhesive component may be attached to only a partial area of an edge on the rear surface of the display panel DP. However, in this case, it may be difficult to maintain the flatness of the display panel DP due to problems such as the center portion of the display panel sinking down due to a step difference (or height difference) between adhesive components, gravity, or the like.

The panel flattening assembly PPA according to embodiments may include a structure for improving the above-described problems. Hereinafter, a description will be made on the assumption that the planar shape of the display panel DP is a rectangle. However, this is an example, and the planar shape of the display panel DP is not limited thereto. Positions of the fixing assemblies 10, 20, 30, and 40 attached to the display panel DP may be variously changed according to the planar shape of the display panel DP.

In an embodiment, first to fourth fixing assemblies 10, 20, 30, and 40 may be respectively disposed at first to fourth corners on the rear surface of the display panel DP. For example, the second corner may be a corner adjacent to the first corner in a first direction DR1, the third corner may be a corner adjacent to the first corner in a second direction DR2, and the fourth corner may be a corner adjacent to the second corner in the second direction DR2.

The second direction DR2 may be different from the first direction DR1. For example, the second direction DR2 may be a direction perpendicular to the first direction DR1 in a plan view. A third direction DR3 may be a direction perpendicular to the first direction DR1 and the second direction DR2. For example, the third direction DR3 may be a direction perpendicular to the rear surface of the display panel DP.

The first to fourth fixing assemblies 10, 20, 30, and 40 may be adhered or bonded to the rear surface of the display panel DP by an adhesive member or the like. Displacements of the first to fourth fixing assemblies 10, 20, 30, and 40 may be controlled by adjusting the displacement adjusting members AM1, AM2, AM3, AM4, AM5, AM6, AM7, and AM8, respectively. By controlling the displacements of the first to fourth fixing assemblies 10, 20, 30, and 40, tension may be applied to the display panel DP, and the display panel DP may be flattened.

In an embodiment, the first fixing assembly 10 may include a first fixing member FM1 and a second fixing member FM2. The first fixing assembly 10 may include a third fixing member FM3. FIG. 2 illustrates the first fixing assembly 10 and other members connected thereto, and the second to fourth fixing assemblies 20, 30, and 40 and the first fixing assembly 10 may have substantially a same or similar configuration(s), except that they are different only in arrangement form.

In an embodiment, the first fixing member FM1, the second fixing member FM2, and the third fixing member FM3 may include a metal or plastic material. However, this is an example, and materials of the first fixing member FM1, the second fixing member FM2, and the third fixing member FM3 are not limited thereto, and may include various materials capable of transferring tension to the display panel DP without being separated from the display panel DP.

In an embodiment, the first fixing member FM1, the second fixing member FM2, and the third fixing member FM3 may have a rectangular planar shape. However, this is an example, and planar shapes of the first fixing member FM1, the second fixing member FM2, and the third fixing member FM3 are not limited thereto. For example, the first fixing member FM1, the second fixing member FM2, and the third fixing member FM3 may have any shape as long as they have a structure capable of flatly pulling the display panel DP.

The first fixing member FM1 may be attached directly to the first corner on the rear surface of the display panel DP. For example, the first fixing member FM1 may be attached to the display panel DP by means of an adhesive tape, resin, or the like, or may be attached to the display panel DP by a process such as bonding.

The second fixing member FM2 may be disposed on the first fixing member FM1, and the third fixing member FM3 may be disposed on the second fixing member FM2.

The first fixing member FM1 may include a first fastening hole H1 and a second fastening hole H2. The second fixing member FM2 may include a third fastening hole H3 overlapping the first fastening hole H1 in the third direction DR3 and a fourth fastening hole H4 overlapping the second fastening hole H2 in the third direction DR3.

As shown in FIG. 2, the first fixing member FM1 and the second fixing member FM2 may be coupled (or connected) by first and second fastening screws TM1 and TM2. The first fastening screw TM1 may be coupled to the third fastening hole H3 and the first fastening hole H1, and the second fastening screw TM2 may be coupled to the fourth fastening hole H4 and the second fastening hole H2.

However, this is an example, and the coupling of the first fixing member FM1 and the second fixing member FM2 is not limited thereto. For example, the first fixing member FM1 and the second fixing member FM2 may be coupled by an adhesive material or by another type of fastening member.

In an embodiment, the second fixing member FM2 may further include a fifth fastening hole H5 and a sixth fastening hole H6. The third fixing member FM3 may include a seventh fastening hole H7 overlapping the fifth fastening hole H5 in the third direction DR3 and an eighth fastening hole H8 overlapping the sixth fastening hole H6 in the third direction DR3. The second fixing member FM2 and the third fixing member FM3 may be coupled by third and fourth fastening screws TM3 and TM4.

The third fastening screw TM3 may be coupled to the fifth fastening hole H5 and the seventh fastening hole H7, and the fourth fastening screw TM4 may be coupled to the sixth fastening hole H6 and the eighth fastening hole H8. However, this is an example, and the coupling of the second fixing member FM2 and the third fixing member FM3 is not limited thereto.

The second to fourth fixing assemblies 20, 30, and 40 and the first fixing assembly 10 may be substantially a same configuration. The second fixing assembly 20 may include first to third fixing members FM1b, FM2b, and FM3b. The second fixing assembly 20 may have a shape symmetrical to that of the first fixing assembly 10 with respect to an axis in the second direction DR2.

The third fixing assembly 30 may include first to third fixing members FM1c, FM2c, and FM3c. The third fixing assembly 30 may have a shape symmetrical to that of the first fixing assembly 10 with respect to an axis of the first direction DR1.

The fourth fixing assembly 40 may include first to third fixing members FM1d, FM2d, and FM3d. The fourth fixing assembly 40 may have a shape symmetrical to that of the second fixing assembly 20 with respect to an axis of the first direction DR1.

A first supporting member SP1 may be disposed between the first fixing assembly 10 and the second fixing assembly 20. The first supporting member SP1 may be disposed to be spaced apart from the display panel DP. The first supporting member SP1 may have a bar shape extending in the first direction DR1. For example, the first supporting member SP1 may have a cylindrical or polygonal column shape extending in the first direction DR1.

According to an embodiment, both ends of the first supporting member SP1 may include fastening holes to which a first displacement adjusting member AM1 and a second displacement adjusting member AM2 are respectively coupled. For example, the first displacement adjusting member AM1 may connect the first fixing assembly 10 and the first supporting member SP1, and the second displacement adjusting member AM2 may connect the second fixing assembly 20 and the first supporting member SP1.

The first supporting member SP1 may include a metal or plastic material. However, this is an example, and the material of the first supporting member SP1 is not limited thereto.

Second to fourth supporting members SP2, SP3, and SP4 and the first supporting member SP1 may include substantially a same material and may have similar shapes.

The second supporting member SP2 may be disposed between the first fixing assembly 10 and the third fixing assembly 30. The second supporting member SP2 may be spaced apart from the display panel DP. Both ends of the second supporting member SP2 may be coupled to the second displacement adjusting member AM2 and the fourth displacement adjusting member AM4, respectively.

The third supporting member SP3 may be disposed between the third fixing assembly 30 and the fourth fixing assembly 40. The third supporting member SP3 may be spaced apart from the display panel DP. Both ends of the third supporting member SP3 may be coupled to a fifth displacement adjusting member AM5 and a sixth displacement adjusting member AM6, respectively.

The fourth supporting member SP4 may be disposed between the second fixing assembly 20 and the fourth fixing assembly 40. The fourth supporting member SP4 may be spaced apart from the display panel DP. Both ends of the fourth supporting member SP4 may be coupled to a seventh displacement adjusting member AM7 and an eighth displacement adjusting member AM8, respectively.

The first displacement adjusting member AM1 may be extended to the first fixing assembly 10. The first displacement adjusting member AM1 may adjust the displacement of the first fixing assembly 10. Accordingly, a distance between the first fixing assembly 10 and a first end of the first supporting member SP1 can be adjusted.

The first displacement adjusting member AM1 may include metal or plastic.

In an embodiment, as shown in FIG. 2, the first displacement adjusting member AM1 may include a first screw SCR1. The first screw SCR1 may include a protrusion PRP1 protruding toward the second fixing assembly 20 in the first direction DR1. At least a portion of the protrusion PRP1 may be inserted and coupled to a fastening hole included in the first end of the first supporting member SP1.

In an embodiment, the first fixing member FM1 and the second fixing member FM2 may include grooves GR1 and GR2 into which a part of the first screw SCR1 is inserted, respectively. The first screw SCR1 may be inserted between the grooves GR1 and GR2.

The grooves GR1 and GR2 may restrict movement of the first screw SCR1 other than rotation of the first screw SCR1 within the first fixing assembly 10. Accordingly, in case that the first screw SCR1 is rotated to be loosened or tightened from the first supporting member SP1, the displacement of the entire first fixing assembly 10 together with the first screw SCR1 may be changed.

By the rotation of the first screw SCR1, the first screw SCR1 and the first fixing assembly 10 may be moved together in the first direction DR1 or in a direction opposite to the first direction DR1, and the distance between the first fixing assembly 10 and the first end of the first supporting member SP1 can be adjusted.

For example, in case that the first screw SCR1 is rotated counterclockwise to loosen from the first supporting member SP1, a first force F1 may also be applied to the first fixing assembly 10 in the direction opposite to the first direction DR1, and the first fixing assembly 10 may be pushed in the direction opposite to the first direction DR1. Accordingly, the display panel DP attached to the first fixing assembly 10 may be pulled in the direction opposite to the first direction DR1 by the first force F1.

In an embodiment, the second to eighth displacement adjusting members AM2 to AM8 may also be implemented in the form of screws. The second to fourth fixing assemblies 20, 30, and 40 and the third to eighth displacement adjusting members AM3 to AM8, and the first fixing assembly 10 and the first screw SCR1 described above may be substantially a same or similar coupling relationship(s).

For example, the third displacement adjusting member AM3 and the seventh displacement adjusting member AM7 may be coupled to the second fixing assembly 20, the fourth displacement adjusting member AM4 and the fifth displacement adjusting member AM5 may be coupled to the third fixing assembly 20, and the sixth displacement adjusting member AM6 and the eighth displacement adjusting member AM8 may be coupled to the fourth fixing assembly 40.

In an embodiment, the third displacement adjusting member AM3 may be coupled to the second fixing assembly 20 to have a symmetrical shape with the first displacement adjusting member AM1. The third displacement adjusting member AM3 and the first screw SCR1 may include a same screw (hereinafter, referred to as a third screw). The third displacement adjusting member AM3 may be inserted and coupled to a fastening hole included in a second end of the first supporting member SP1. For example, the third screw may include a protrusion protruding toward the first fixing assembly 10. The protrusion may be coupled to the fastening hole of the second end of the first supporting member SP1.

By rotation of the third screw, the third screw and the second fixing assembly 20 may be moved together in the first direction DR1 or in the direction opposite to the first direction DR1, and a distance between the second fixing assembly 20 and the second end of the first fixing member SP1 can be adjusted. For example, in case that the third screw SCR3 is rotated counterclockwise to loosen from the first supporting member SP1, a second force F2 may also be applied to the second fixing assembly 20 in the first direction DR1, and the second fixing assembly 20 may be pushed in the first direction DR1. Accordingly, the display panel DP attached to the second fixing assembly 20 may be pulled in the first direction DR1 by the second force F2.

In an embodiment, the second displacement adjusting member AM2 may be disposed between the second fixing member FM2 and the third fixing member FM3. The second displacement adjusting member AM2 may protrude in the second direction DR2. The second displacement adjusting member AM2 may adjust a distance between the first fixing assembly 10 and a first end of the second supporting member SP2 by adjusting the displacement of the first fixing assembly 10.

The second displacement adjusting member AM2 may include a second screw SCR2 protruding in the second direction DR2. The second screw SCR2 may include a protrusion PRP2 that protrudes toward the third fixing assembly 30 and is coupled to the second supporting member SP2.

In an embodiment, the second fixing member FM2 and the third fixing member FM3 may include grooves GR2 and GR3 into which part of the second screw SCR2 is inserted so that movement of the second screw SCR2 other than rotation of the second screw SCR2 within the first fixing assembly 10 is restricted. The second screw SCR2 may be inserted between the grooves GR3 and GR4. Accordingly, in case that the second screw SCR2 is rotated to be loosened or tightened from the second supporting member SP2, the displacement of the entire first fixing assembly 10 together with the second screw SCR2 may be changed.

By the rotation of the second screw SCR2, the second screw SCR2 and the first fixing assembly 10 may be moved together in the second direction DR2 or in a direction opposite to the second direction DR2, and the distance between the first fixing assembly 10 and the first end of the second supporting member SP2 may be adjusted.

For example, as shown in FIGS. 1 and 3, in case that the second screw SCR2 is rotated counterclockwise to loosen from the second supporting member SP2, a third force F3 may also be applied to the first fixing assembly 10 in the direction opposite to the second direction DR2, and the first fixing assembly 10 may be pushed in the direction opposite to the second direction DR2. Accordingly, the display panel DP attached to the first fixing assembly 10 may be pulled in the direction opposite to the second direction DR2 by the third force F3.

Similarly, a fourth force F4 may be applied to the third fixing assembly 30 in the second direction DR2 by displacement control of the fourth displacement adjusting member AM4, and the third fixing assembly 30 may be pushed in the second direction DR2. Accordingly, the display panel DP attached to the third fixing assembly 30 may be pulled in the second direction DR2 by the fourth force F4.

As described above, the first to eighth displacement adjusting members AM1 to AM8 may be implemented as screws, and the displacements of the first to fourth fixing assemblies 10, 20, 30, and 40 may be adjusted by rotation of the screws. Accordingly, as the display panel DP is pulled in four directions by the first to fourth forces F1 to F4, the substrate and the surface of the display panel DP including the substrate may be uniformly flattened.

Since the area of the first to fourth fixing assemblies 10, 20, 30, and 40 attached to the rear surface of the display panel DP to fix the shape of the display panel DP may be minimized, the influence of surface roughness thereof may be minimized. Further, since the displacements of the fixing assemblies 10, 20, 30, and 40 may be individually adjusted, the surface of the display panel DP may be flattened in an optimal state under various conditions.

Figure 4:
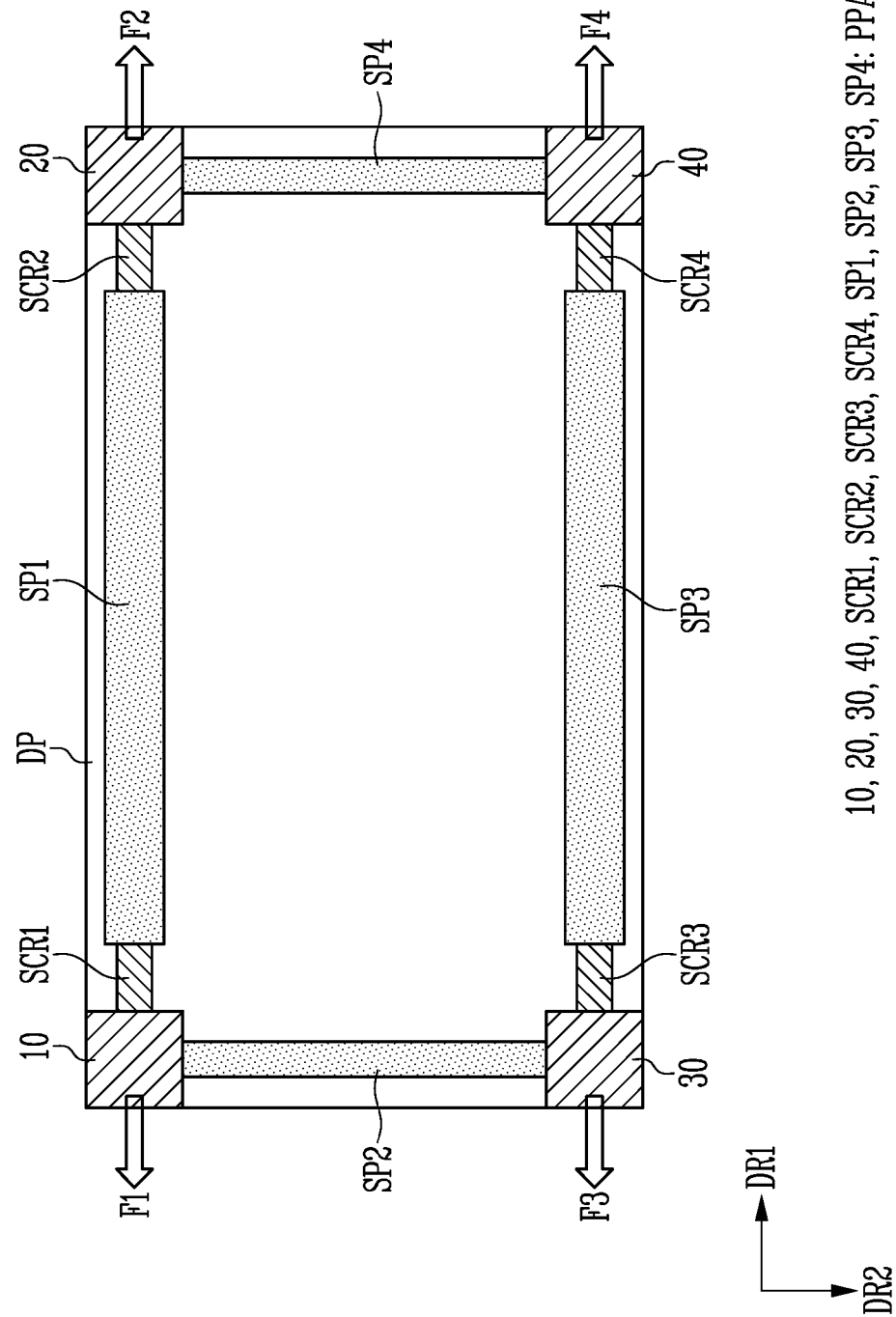
FIG. 4 is a diagram schematically illustrating an example of the panel flattening assembly.

FIG. 4 is a diagram schematically illustrating an example of the panel flattening assembly.

As illustrated in FIG. 4, the same reference numerals are used for the components described with reference to FIGS. 1 and 2, and duplicate descriptions of these components will be omitted.

Referring to FIG. 4, a panel flattening assembly PPA1 may include fixing assemblies 10, 20, 30, and 40, supporting members SP1, SP2, SP3, and SP4, and screws SCR1, SCR2, SCR3, and SCR4.

A first screw SCR1 may be connected between a first fixing assembly 10 and a first end of a first supporting member SP1. A second screw SCR2 may be connected between a second fixing assembly 20 and a second end of the first supporting member SP1.

A first force F1 and a second force F2 may be applied to the display panel DP by rotation of the first screw SCR1 and the second screw SCR2.

A third screw SCR3 may be connected between a third fixing assembly 30 and a first end of a third supporting member SP3. A fourth screw SCR4 may be connected between a fourth fixing assembly 40 and a second end of the third supporting member SP3.

A third force F3 and a fourth force F4 may be applied to the display panel DP by rotation of the third screw SCR3 and the fourth screw SCR4.

In an embodiment, a second supporting member SP2 may be coupled directly to the first fixing assembly 10 and the third fixing assembly 30. Accordingly, the second supporting member SP2 may only serve to support the first and third fixing assemblies 10 and 30 and the display panel DP.

Likewise, a fourth supporting member SP4 may be coupled directly to the second fixing assembly 20 and the fourth fixing assembly 40. Accordingly, the fourth supporting member SP4 may only serve to support the second and fourth fixing assemblies 20 and 40 and the display panel DP.

Accordingly, a pulling force may be applied to the display panel DP in the first direction DR1 and in the direction opposite to the first direction DR1. The panel flattening assembly PPA1 may be more advantageous in terms of manufacturing cost compared to the panel flattening assembly PPA of FIG. 1. The direction of the force applied to the display panel DP may be freely controlled according to the arrangement and/or positions of the screws SCR1, SCR2, SCR3, and SCR4 and the fixing assemblies 10, 20, 30, and 40.

Figure 5:
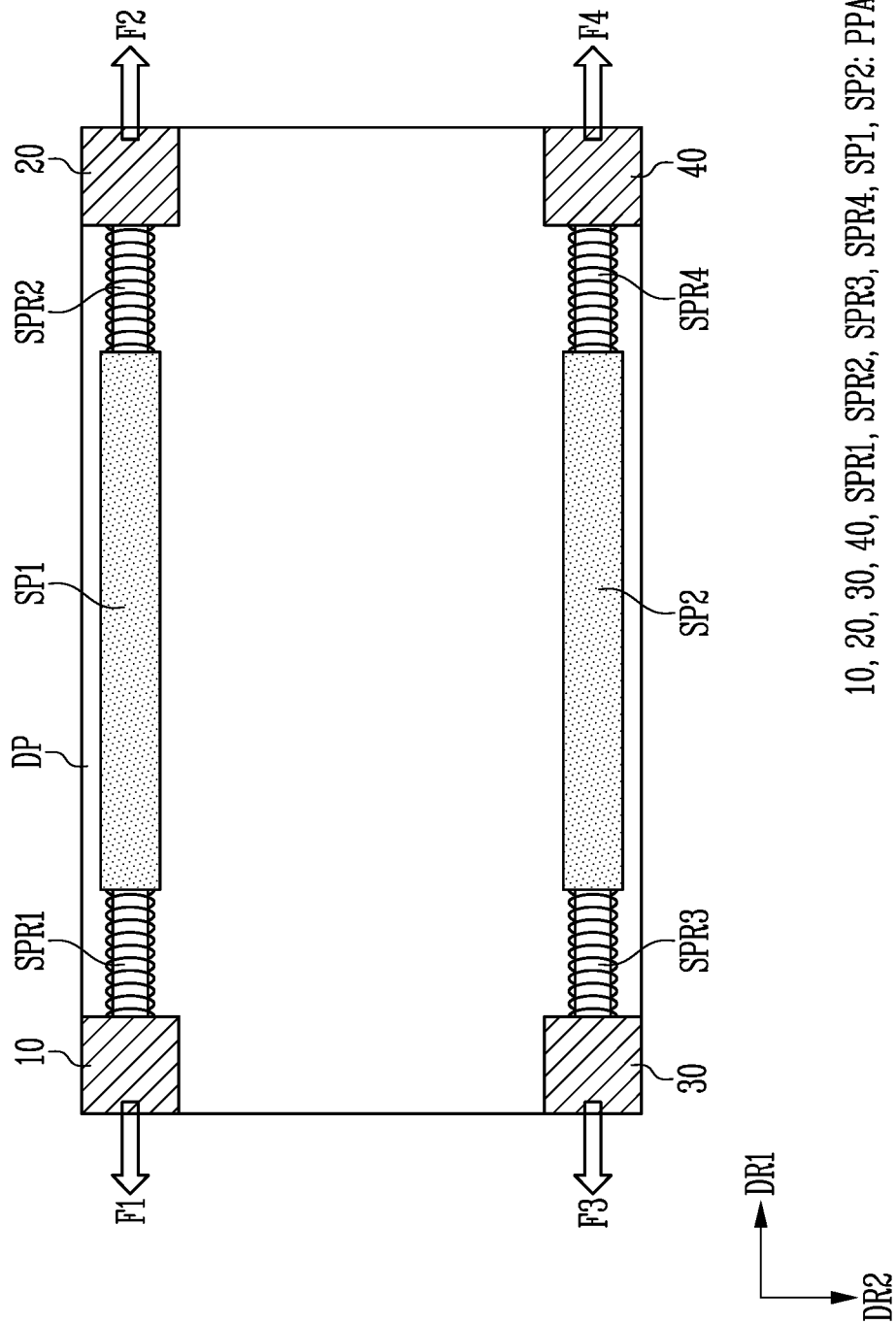
FIG. 5 is a diagram schematically illustrating an example of the panel flattening assembly.

FIG. 5 is a diagram schematically illustrating an example of the panel flattening assembly.

As illustrated in FIG. 5, the same reference numerals are used for the components described with reference to FIGS. 1, 2, and 4, and duplicate descriptions of these components will be omitted.

Referring to FIG. 5, a panel flattening assembly PPA2 may include fixing assemblies 10, 20, 30, and 40, supporting members SP1, SP2, SP3, and SP4, and spring members SPR1, SPR2, SPR3, and SPR4.

For example, the displacement adjusting members described with reference to FIG. 1 may include the spring members SPR1, SPR2, SPR3, and SPR4, respectively. The embodiment of FIG. 5 may be substantially the same as the panel flattening assembly PPA1 of FIG. 4 except that the screws SCR1, SCR2, SCR3, and SCR4 of FIG. 4 are replaced with the spring members SPR1, SPR2, SPR3, and SPR4.

A first spring member SPR1 may be connected between a first fixing assembly 10 and a first end of a first supporting member SP1. A second screw SCR2 may be connected between a second fixing assembly 20 and a second end of the first supporting member SP1.

The first spring member SPR1 may be inserted between the first fixing assembly 10 and the first end of the first supporting member SP1 by the elastic force of the first spring member SPR1. A first force F1 that pushes the first fixing assembly 10 in the first direction DR1 or in a direction opposite to the first direction DR1 may be generated by the restoring force of the first spring member SPR1.

Second, third, and fourth forces F2, F3, and F4 may be generated in the first direction DR1 or in a direction opposite to the first direction DR1 by the restoring force of each of the second, third, and fourth spring members SPR2, SPR3, and SPR4.

According to an embodiment, the second and fourth supporting members SP2 and SP4 of FIG. 1 may be omitted, and thus manufacturing cost may be reduced.

As described above, the displacement adjusting members may be implemented with various materials as well as screws.

Figure 6:
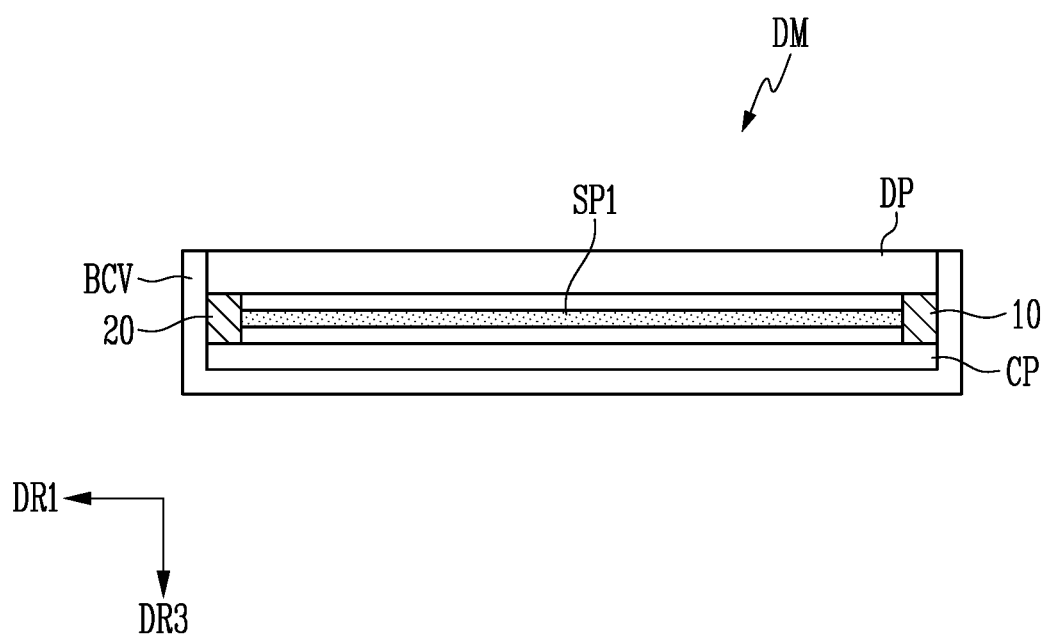
FIG. 6 is a diagram schematically illustrating a display module according to embodiments of the disclosure.

FIG. 6 is a diagram schematically illustrating a display module according to embodiments of the disclosure.

Referring to FIGS. 1 and 6, a display module DM may include a display panel DP, a panel flattening assembly PPA, a circuit plate CP, and a back cover BCV.

The display panel DP may include a thin substrate, a backplane structure formed on the entire surface of the substrate, and a pixel structure.

The panel flattening assembly PPA may be attached to a rear surface of the substrate of the display panel DP. The panel flattening assembly PPA may include fixing assemblies 10, 20, 30, and 40, supporting members SP1, SP2, SP3, and SP4, and displacement adjusting members AM1, AM2, AM3, AM4, AM5, AM6, AM7, and AM8. The panel flattening assembly PPA may flatten the surface of the display panel DP and fix the shape thereof.

Since the panel flattening assembly PPA has been described in detail with reference to FIGS. 1 to 5, duplicate descriptions thereof will be omitted.

The circuit plate CP may be disposed on the panel flattening assembly PPA. For example, the circuit plate CP may be disposed under the panel flattening assembly PPA. The circuit plate CP may be disposed to accommodate or mount an external circuit, an IC, and the like for driving the display panel DP. For example, a processor, a memory device, and the like may be mounted or bonded to the circuit plate CP.

The back cover BCV may be disposed to cover the rear surface of the display panel DP, the panel flattening assembly PPA, and the circuit plate CP. The back cover BCV may protect internal components from external contamination, foreign substances, impact, and the like.

The back cover BCV may be arranged to surround and protect the panel flattening assembly PPA and the circuit plate CP. The back cover BCV may cover the side surface of the display panel DP. However, this is an example, and the shape of the back cover BCV is not limited thereto.

Figure 7:
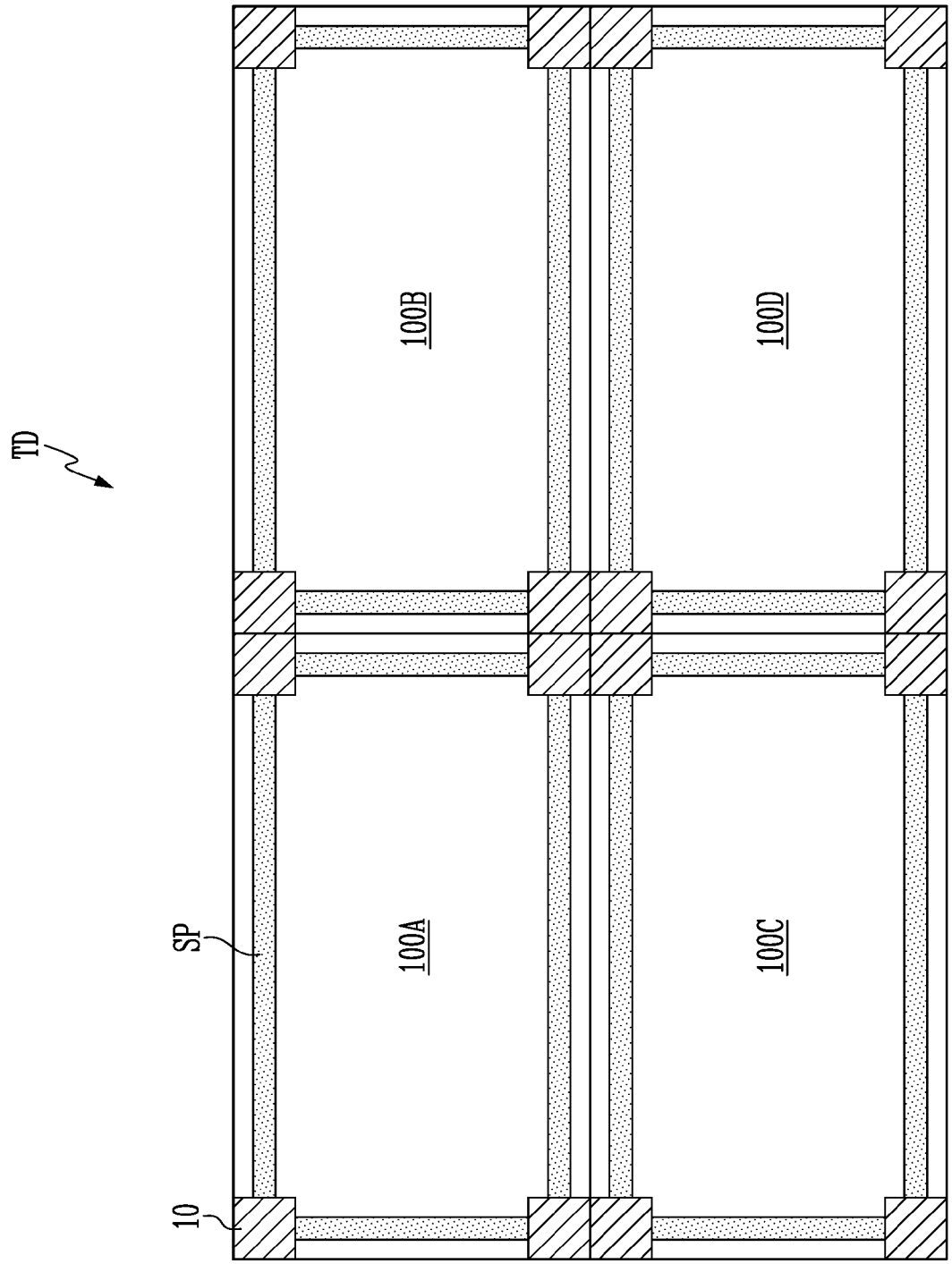
FIG. 7 is a diagram schematically illustrating an example of a multi-screen display device including display panels to which the panel flattening assembly of FIG. 1 is applied.

FIG. 7 is a schematic diagram illustrating an example of a multi-screen display device including display panels to which the panel flattening assembly of FIG. 1 is applied.

Referring to FIGS. 1 and 7, a multi-screen display device TD (also referred to as a tiled display) may include panel assemblies 100A, 100B, 100C, and 100D arranged in a matrix form.

Each of the display panels DP of the panel assemblies 100A, 100B, 100C, and 100D may individually display an image or divide and display an image. The display panels DP may include display panels of a same type, structure, size, or method, but the disclosure is not limited thereto.

The panel assemblies 100A, 100B, 100C, and 100D may be physically coupled by a housing (not shown) to constitute a multi-screen display device TD.

Each of the panel assemblies 100A, 100B, 100C, and 100D may include a panel flattening assembly PPA (see FIG. 1) including a fixing assembly 10 and a supporting member SP.

In an embodiment, at least one of fixing assemblies 10 may include a magnetic material. A mutual attraction may act between the fixing assemblies 10 adjacent to each other. Accordingly, the panel flattening assembly PPA (see FIG. 1) may assist in physical coupling between the panel assemblies 100A, 100B, 100C, and 100D in the multi-screen display device TD.

As described above, the panel flattening assembly and the display module including the same according to the embodiments may include the fixing assemblies attached to the rear surface of the display panel with a minimum area (e.g., corner areas). Accordingly, the influence of the surface roughness by the fixing assemblies may be minimized, and thus image quality may be improved. In addition, since the displacements of the fixing assemblies are individually adjusted by the force generated by the displacement adjusting members, the surface of the display panel may be substantially flattened and fixed in an optimal state under various conditions. Accordingly, shape defects such as distortion and warpage that occur depending on the assembly state of the display panel can be improved without deterioration of image quality.

However, effects of the disclosure are not limited to the above-described effects, and may be variously extended without departing from the spirit and scope of the disclosure.

As described above, embodiments of the disclosure have been described with reference to the drawings. However, those skilled in the art will appreciate that various modifications and changes can be made to the disclosure without departing from the spirit and scope of the disclosure.

What is claimed is:

1. A panel flattening assembly comprising:
    a first fixing assembly and a second fixing assembly respectively disposed at a first corner and a second corner adjacent to the first corner in a first direction on a rear surface of a display panel;
    a first supporting member disposed between the first fixing assembly and the second fixing assembly and spaced apart from the display panel;
    a first displacement adjusting member connected to the first fixing assembly and adjusting a distance between the first fixing assembly and a first end of the first supporting member by adjusting a displacement of the first fixing assembly; and
    a second displacement adjusting member connected to the second fixing assembly and adjusting a distance between the second fixing assembly and a second end of the first supporting member by adjusting a displacement of the second fixing assembly.

2. The panel flattening assembly of claim 1, wherein the first fixing assembly comprises:
    a first fixing member attached to the first corner on the rear surface of the display panel; and
    a second fixing member connected to the first fixing member with the first displacement adjusting member disposed between the second fixing member and the first fixing member.

3. The panel flattening assembly of claim 2, wherein the first displacement adjusting member comprises:
    a first screw protruding toward the second fixing assembly and having a protrusion connected to the first supporting member.

4. The panel flattening assembly of claim 3, wherein the first fixing member and the second fixing member include grooves into which part of the first screw is inserted so that movement other than rotation of the first screw is restricted within the first fixing assembly.

5. The panel flattening assembly of claim 3, wherein by rotation of the first screw,
    the first screw and the first fixing assembly are moved together in the first direction or in a direction opposite to the first direction, and
    the distance between the first fixing assembly and the first end of the first supporting member is adjusted.

6. The panel flattening assembly of claim 3, wherein the second displacement adjusting member comprises:
    a second screw protruding toward the first fixing assembly and having a protrusion connected to the first supporting member.

7. The panel flattening assembly of claim 6, wherein by rotation of the second screw,
    the second screw and the second fixing assembly are moved together in the first direction or in a direction opposite to the first direction, and
    the distance between the second fixing assembly and the second end of the first supporting member is adjusted.

8. The panel flattening assembly of claim 6, further comprising:
    a third fixing assembly disposed at a third corner adjacent to the first corner in a second direction on the rear surface of the display panel; and
    a second supporting member disposed between the first fixing assembly and the third fixing assembly and spaced apart from the display panel.

9. The panel flattening assembly of claim 8, further comprising:
    a third displacement adjusting member disposed on the second fixing member and adjusting a distance between the first fixing assembly and a first end of the second supporting member by adjusting the displacement of the first fixing assembly.

10. The panel flattening assembly of claim 9, wherein the first fixing assembly further includes a third fixing member disposed on the third displacement adjusting member and the second fixing member, and
    the third displacement adjusting member includes a third screw protruding toward the third fixing assembly and having a protrusion connected to the second supporting member.

11. The panel flattening assembly of claim 10, wherein the second fixing member and the third fixing member include grooves into which part of the third screw is inserted so that movement other than rotation of the third screw is restricted within the first fixing assembly.

12. The panel flattening assembly of claim 9, further comprising:
    a fourth fixing assembly disposed at a fourth corner adjacent to the second corner in the second direction on the rear surface of the display panel;
    a third supporting member disposed between the third fixing assembly and the fourth fixing assembly and spaced apart from the display panel;
    a fourth supporting member disposed between the second fixing assembly and the fourth fixing assembly and spaced apart from the display panel;
    a fourth displacement adjusting member connected to the third fixing assembly and a second end of the second supporting member;
    a fifth displacement adjusting member connected to the third fixing assembly and a first end of the third supporting member;
    a sixth displacement adjusting member connected to the fourth fixing assembly and a second end of the third supporting member;

a seventh displacement adjusting member connected to the second fixing assembly and a first end of the fourth supporting member; and an eighth displacement adjusting member connected to the fourth fixing assembly and a second end of the fourth supporting member.

13. The panel flattening assembly of claim 8, wherein the second supporting member is directly connected to the first fixing assembly and the third fixing assembly.

14. The panel flattening assembly of claim 1, wherein the first displacement adjusting member includes a first spring member disposed between the first fixing assembly and the first end of the first supporting member, and the second displacement adjusting member includes a second spring member disposed between the second fixing assembly and the second end of the first supporting member.

15. The panel flattening assembly of claim 1, wherein the first fixing assembly and the second fixing assembly include a magnetic material.

16. A display module comprising:

a display panel including a substrate;

a panel flattening assembly attached to a corner portion on a rear surface of the display panel;

a circuit plate disposed on the panel flattening assembly; and a back cover covering the rear surface of the display panel, the panel flattening assembly, and the circuit plate, wherein the panel flattening assembly comprises:

a first fixing assembly and a second fixing assembly respectively disposed at a first corner and a second corner adjacent to the first corner in a first direction on the rear surface of the display panel;

a first supporting member disposed between the first fixing assembly and the second fixing assembly and spaced apart from the display panel;

a first displacement adjusting member connected to the first fixing assembly and adjusting a distance between the first fixing assembly and a first end of the first supporting member by adjusting a displacement of the first fixing assembly; and a second displacement adjusting member connected to the second fixing assembly and adjusting a distance between the second fixing assembly and a second end of the first supporting member by adjusting a displacement of the second fixing assembly.

17. The display module of claim 16, wherein the first fixing assembly comprises:

a first fixing member attached to the first corner on the rear surface of the display panel; and a second fixing member connected to the first fixing member with the first displacement adjusting member disposed between the second fixing member and the first fixing member.

18. The display module of claim 17, wherein the first displacement adjusting member comprises:

a first screw protruding toward the second fixing assembly and having a protrusion connected to the first supporting member.

19. The display module of claim 16, wherein the second displacement adjusting member comprises:

a second screw protruding toward the first fixing assembly and having a protrusion connected to the first supporting member.

20. The display module of claim 16, wherein the first fixing assembly and the second fixing assembly include a magnetic material.

\* \* \* \* \*